United States Patent [19]

Archer

[11] Patent Number: 5,350,053

[45] Date of Patent: Sep. 27, 1994

[54] BELT CONVEYOR INPUT STATION

[75] Inventor: Neil Archer, Paducah, Ky.

[73] Assignee: Arch Environmental Equipment, Inc., Paducah, Ky.

[21] Appl. No.: 796,420

[22] Filed: Nov. 22, 1991

[51] Int. Cl.⁵ ............................................ B65G 47/19
[52] U.S. Cl. .................... 198/525; 198/823; 198/824; 198/841
[58] Field of Search ............ 198/525, 823, 824, 836.1, 198/841

[56] References Cited

U.S. PATENT DOCUMENTS

| | | | |
|---|---|---|---|
| 2,731,138 | 1/1956 | Parisi | 198/823 |
| 4,789,056 | 12/1988 | Bourdeau | 198/841 |
| 4,793,470 | 12/1988 | Andersson | 198/823 |
| 4,898,272 | 2/1990 | Swinderman et al. | 198/823 |
| 4,989,727 | 2/1991 | Gordon | 198/836.1 |
| 5,048,669 | 9/1991 | Swinderman | 198/836.1 |

FOREIGN PATENT DOCUMENTS 2510407  9/1976  Fed. Rep. of Germany ... 198/836.1

Primary Examiner—Joseph E. Valenza
Attorney, Agent, or Firm—Dorn, McEachran, Jambor & Keating

[57] ABSTRACT

An input station for a belt conveyor of the kind including a continuous conveyor belt that moves in a conveyor run through an input station to a discharge location, around a head pulley, and in a return run around a tail pulley back to the input station and the conveyor run. At the input station the conventional center support rollers are retained but the support rollers along the sides of the belt are replaced by a plurality of elongated, stationary, flat support members that support the sides of the conveyor belt throughout the input station, improving the seal to input station skirtboards and materially reducing or eliminating input leakage while maintaining roller support and flexibility in the center of the belt, with minimal friction increase.

6 Claims, 2 Drawing Sheets

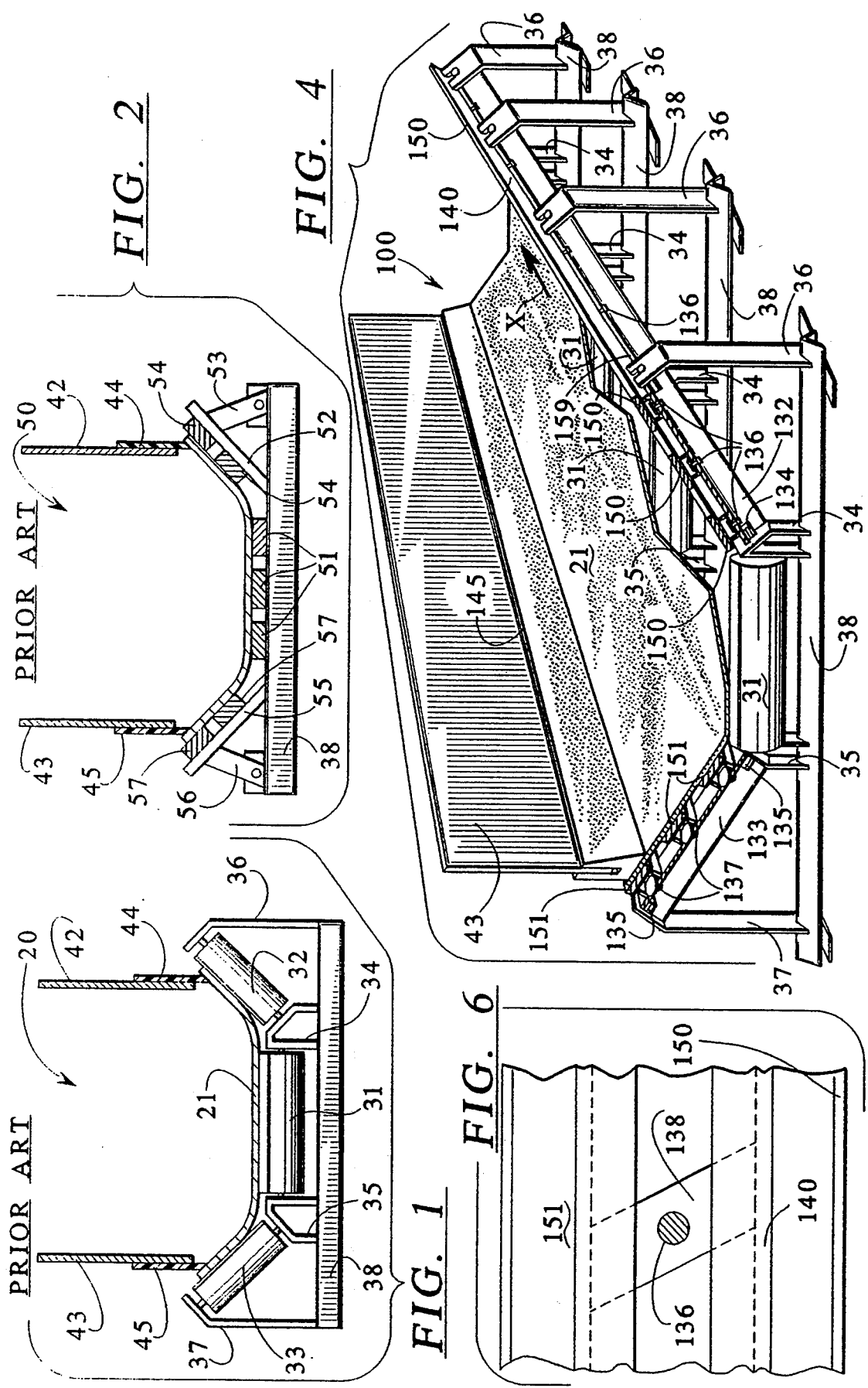

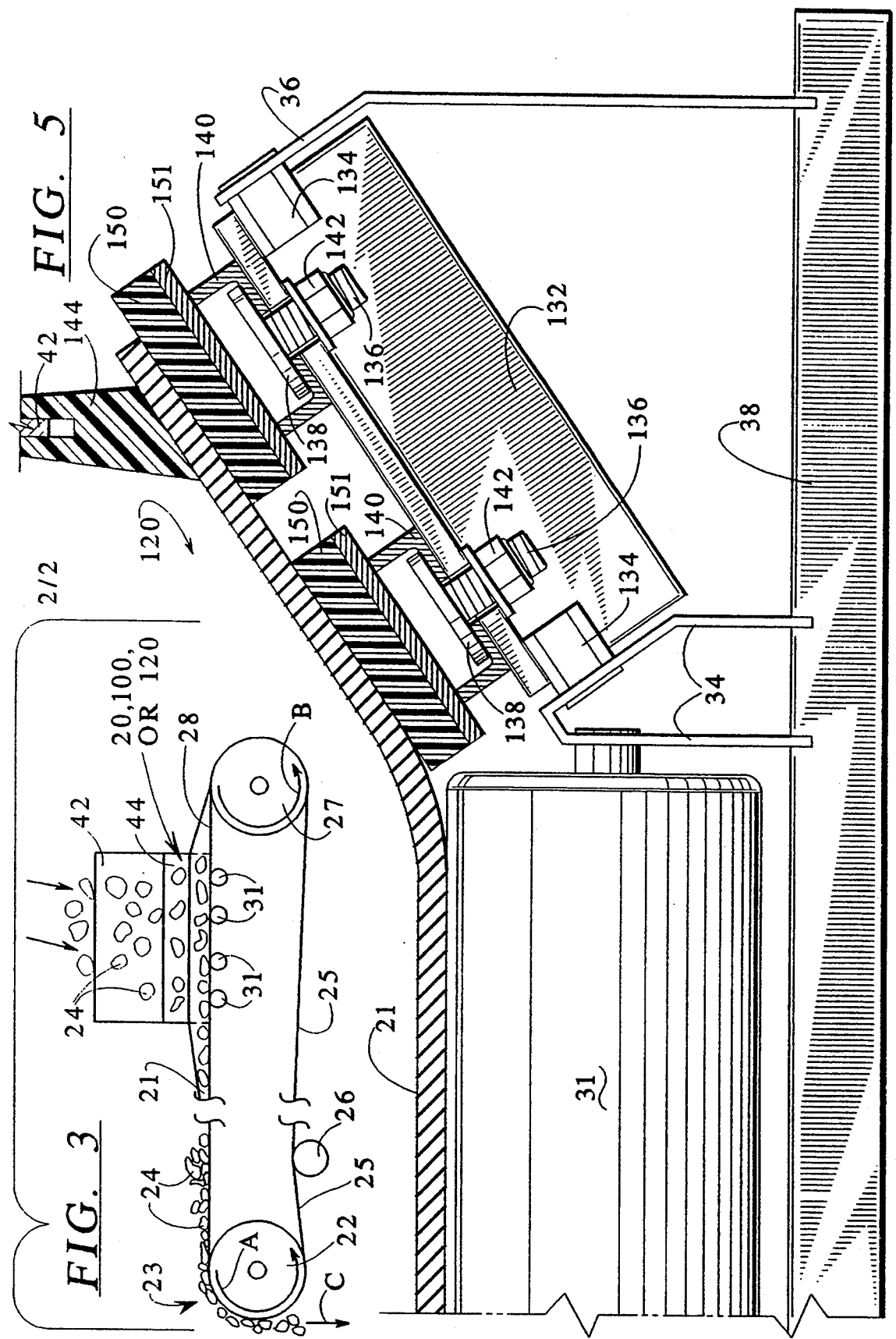

BELT CONVEYOR INPUT STATION

BACKGROUND OF THE INVENTION

There are many applications, particularly in mining and in industry, in which continuous conveyor belts are utilized to move bulk materials such as coal, grain, and the like from one location to another. In any system of this kind, the bulk material must be deposited on the moving conveyor belt; interruption of belt movement to receive a new load is economically infeasible. At the discharge end, it is usually necessary to scrape or clean the belt to make sure that all of the bulk material is left at the desired new location. Both ends of such a continuous belt conveyor system presents substantial problems; this invention is concerned with the problems and difficulties that occur in depositing bulk material on the moving belt for transport to a distant location.

A major problem of the input station of any continuous conveyor belt system is leakage of the bulk material being transported by the system. Broadly speaking, this has been met to a substantial extent by resilient aprons affixed to rigid skirtboards around the input station. Examples previously known resilient skirtboard aprons and apron mounts are disclosed in Gordon U.S. Pat. Nos. 4,231,471, 4,436,446, 4,877,125, and 4,989,727. Perhaps the best such skirtboard apron is the simple but effective device described and claimed in Gordon U.S. Pat. No. 4,989,727 and sold commercially under the designation ATLASTASEAL. Even that skirtboard apron, however, may have leakage problems, particularly as the result of appreciable movement of the conveyor belt, vertically or laterally, other than in the conveying direction through the input station.

It has been conventional, in the input stations for continuous belt conveyor systems, to support the conveyor belt in a generally open upwardly-facing U-shaped configuration at the input station, usually on three separate series of idler or support rollers. This input station configuration has one set of horizontally oriented support rollers extending longitudinally of the center of the belt. On each side there is another set of support rollers projecting upwardly at an acute angle and supporting a side portion of the belt.

Inevitably, there is some sagging of the belt between each set of support rollers. This leads to leakage problems at the input station. In part, this kind of leakage has been reduced by modifying the input station of the conveyor belt system to afford a plurality of elongated stationary support plates or rails under the conveyor belt. As with the rollers, the side portions of the belt are supported at an acute angle to the center portion, which is basically horizontal. However, the benefit of the resulting reduction in leakage, while desirable, is at least in part offset by increased drag on the conveyor belt, which may produce appreciable wear on the belt and which also may increase the costs of operation for the conveyor.

SUMMARY OF THE INVENTION

It is a principal object of the present invention, therefore, to provide a new and improved input station for a continuous belt conveyor of the kind used in mines, coal preparation stations, power stations, and other industrial applications for movement of bulk materials from one location to another.

Another object of the invention is to provide a new and improved input station for a continuous belt conveyor employed to transport bulk materials from one location to another, which input station reduces leakage of the bulk material from the conveyor while at the same time avoiding undue frictional drag on the belt, so that belt life is maximized.

A specific object of the invention is to provide a new and improved replacement kit for the side rollers of a conventional input station for a continuous belt conveyor system, which kit affords improved operation as regards both leakage and drag reduction at minimum cost and with assured long operating life.

Accordingly, the invention relates to an input station for a belt conveyor comprising a continuous conveyor belt of given width having a conveyor run extending through an input station to and around a head pulley at a discharge location, and a return run from the head pulley to and around a tail pulley back into the input station. The input station comprises a frame, center belt support means having a width less than the belt width, mounted on the frame, for supporting the central portion of the conveyor belt throughout the input station; the center belt support means comprises a plurality of support rollers extending across and engaging the underside of the conveyor run of the conveyor belt throughout the input station. The input station further comprises first and second lateral belt support means, each having a width less than the belt width, mounted on opposite sides of the frame adjacent the center belt support means; each lateral belt support means includes at least one belt support rail, extending parallel to the conveyor belt, engaging the underside of the conveyor run of the conveyor belt and supporting a lateral portion of the conveyor belt, with no appreciable sag, throughout the input station, at an acute angle to the central portion of the conveyor belt. The input station also has first and second input skirtboard means, positioned above opposite sides of the conveyor belt and each extending longitudinally of the belt, for sealing off the lateral edges of the conveyor belt at the input station.

BRIEF DESCRIPTION OF THE DRAWINGS

FIGS. 1 and 2 are simplified cross-sectional elevation views illustrative of prior art input stations for continuous belt conveyor systems;

FIG. 3 is a simplified schematic illustration of a continuous belt conveyor system;

FIG. 4 is a perspective view, partly in cross-section, of an input station for a belt conveyor constructed in accordance with a preferred embodiment of the present invention;

FIG. 5 is a transverse sectional elevation view of one-half of a belt conveyor input station like that of FIG. 4; and FIG. 6 is a detail view of a preferred support rail mount used in FIGS. 4 and 5.

DESCRIPTION OF THE PREFERRED EMBODIMENT

FIG. 1 illustrates a well known construction used for the input station 20 of a belt conveyor of the kind comprising a continuous conveyor belt 21. Conveyor belt 21 is utilized in a conveyor system of the kind shown schematically in FIG. 3; belt 21 extends through input station 20 to and around a head pulley 22 that rotates in the direction indicated by arrow A. The head pulley 22 is at a discharge location 23 where the bulk material 24 carried by belt 21 is discharged as indicated by arrow C. The conveyor system usually includes one or more belt scrapers (not shown) at or near the discharge location 23, FIG. 3. From head pulley 22 belt 21 extends on a return run 25 that may include an idler 26, to and around a tail pulley 27 that rotates in the direction indicated by arrow B. Thus, the continuous belt 21 comes back to its conveyor run 28 from the input station or location 20 to the discharge location 23.

In a conventional input station for conveyor belt 21, as best shown in FIG. 1, belt 21 is supported on a set of center support rollers 31 and on two sets of side support rollers 32 and 33. Each center support roller 31 is mounted between a pair of center stanchions 34 and 35. Each side belt support roller 32 on one side of belt 21 is mounted between one of the center stanchions 34 and a side stanchion 36. The other side support roller 33 in each set is mounted between the second center stanchion 35 and a side stanchion 37. All of the stanchions 34–37 are affixed to and supported by a suitable base or frame member 38.

The conventional input station 20 of FIG. 1 further comprises skirtboard means including two rigid vertical skirtboards 42 and 43 located above the opposite sides of the input station. A resilient skirtboard apron 44 mounted on skirtboard 42 extends downwardly into engagement with the side edge portion of belt 21 on roller 32. Similarly, there is a second skirtboard apron 45 mounted on skirtboard 43 and projecting downwardly into engagement with the edge of belt 21 on roller 33. A variety of techniques have been used for mounting resilient aprons such as members 44 and 45 on skirtboards like members 42 and 43 at the input station of a belt conveyor. It will be understood that although only one set 31–33 of support rollers is shown in FIG. 1, the conventional input station 20 for a continuous conveyor belt system incorporates a substantial number of sets of center and side rollers throughout the length of the input station as generally indicated by rollers 31 in FIG. 3. It will also be understood by those skilled in the art that skirtboards 42 and 43 and aprons 44 and 45 have substantial length in the direction of movement of conveyor belt 21, also as generally indicated in FIG. 3. For FIG. 1 it is assumed that the movement of belt 21 is toward the plane of the drawing.

If the elements of input station 20 all worked perfectly, keeping belt 21 taut as indicated in FIG. 3, there would be little or no leakage problem. In real life, this does not happen. Rather, the belt 21 sags a bit between each of the support rollers 31 and each of the lateral support rollers associated with the center support rollers. As a consequence, there is often a substantial leakage problem around the bottom of each of the two aprons 44 and 45. Resolution of the leakage problem is quite difficult.

FIG. 2 illustrates another known form of input station 50 that has been used with continuous belt conveyor systems. In this instance, the base member 38 carries a plurality of support rails 51 that extend longitudinally down the center of the input station. As with FIG. 1, it is assumed that the direction of movement of conveyor belt 21 in FIG. 2 is toward the plane of the drawing. The skirtboards 42 and 43 and their aprons 44 and 45 may be the same as in the station 20 illustrated in FIGS. 1 and 3.

At the right-hand side of input station 50, FIG. 2, there is a fixed support member 52 that extends upwardly at an acute angle from frame 38. Support member 52 may nave an additional brace 53. On this side of station 50 there are two additional belt support members or rails 54 that engage the underside of belt 21 and support it. At the left-hand side of input station 50, FIG. 2, there is another angular lateral support member 55 that extends upwardly at an acute angle to base 38 and that may be supported by a further brace 56. Two additional belt support rails 57 are mounted upon member 55. Supports 52 and 55 and braces 53 and 56 are repeated several times through the length of input station 50, just like rollers 31–33 of FIGS. 1 and 2. All of the support rails 51, 54 and 57 preferably extend for the full length of the input station 50, though input station 50 can be constructed in sections if desired.

Operation of input station 50 is like that of input station 20. In each instance, bulk material 24 (see FIG. 3) is discharged into the input station between skirtboards 42 and 43 and onto belt 21. It is carried out of the input station on belt 21 toward the discharge location as illustrated at 23 in FIG. 3. In input station 50, FIG. 2, as in station 20, the material is confined by skirtboard aprons 44 and 45, which limit leakage at the edges of the belt. With respect to edge, 50 of FIG. 2 is better than station 20 of FIG. 1 because the conveyor belt 21 is flatter, as it moves through input station 50, than in station 20. Stated differently, each of the outermost belt support rails 54 and 57 of station 50, FIG. 2, affords a more consistent engagement with the associated apron 44 or 45 than is possible with the construction of input station 20, FIG. 1, where there is inevitably some sag between rolls 32 and 33 at the opposite sides of the input station. On the other hand, though input station 50 shows less leakage and may be an improvement with respect to possible impact damage, it does increase the drag on conveyor belt 21 as the belt moves through the input station. Thus, the wear on the belt is higher with the construction shown in FIG. 2 than in FIG. 1. Moreover, power requirements for the overall conveyor system may be somewhat increased.

FIGS. 4 and 5 show similar input stations 100 and 120, each constructed in accordance with the present invention. Each of these input stations combines features from the two previously known input stations, and each affords significant improvements over both known constructions. In the input station 100, FIG. 4, conveyor belt 21, moving in the direction of the arrow X, is again maintained in an open, upwardly facing U-shaped configuration. The supporting frame is the same as for station 20, FIG. 1; it includes the base members 38, the center stanchions 34 and 35, and the side stanchions 36 and 37. Four pairs of center stanchions 34 and 35 are included in the portion of input station 100, FIG. 4, along with four sets of side stanchions 36 and 37. It should be understood, however, that the overall length of input station 100 may be substantially greater than shown and that there may be more stanchions and more of the central support rollers 31, which remain unchanged from station 20 of FIG. 1.

In input station 100, FIG. 4 however, there are no side belt support rollers such as the rollers 32 and 33 of FIG. 1. Thus, at the right-hand side of input station 100, instead of side support rollers there are a plurality of fixed lateral support members 132. Each support member 132 is a length of angle iron having two mounting members 134 welded or otherwise affixed to its opposite ends. Each mounting member 134 has a configuration such that it can be fitted into the stanchions 34 and 36 as a direct replacement for a side support roller such as one of the rollers 32, FIG. 1. Of course, this mounting arrangement positions the lateral support member 132 at an acute angle to the frame or base member 38.

In the construction illustrated in FIG. 4, there are three mounting bolts 136 extending upwardly through the horizontal portion of each of the angle lateral support members 132. In the narrower input station 120 of FIG. 5, there are just two such bolts. Each bolt has an enlarged head 138, as best shown in FIGS. 5 and 6, that is positioned within an elongated C-shaped steel rail base 140. Each metal base element 140 preferably extends for the full length of the input station; see FIG. 4. There is a nut 142 on each bolt 136, as shown in FIG. 5. Each slider rail base element 140 supports a slider rail 150; FIGS. 4–6. Each slider rail 150 includes a metal pad welded to the related channel base 140. The surface portion of each slider rail or belt support 150, on the other hand, is preferably a resin composition affording low friction with respect to belt 21, because the belt support rail engages and supports the bottom surface of the conveyor belt. A preferred material for use in the belt-contacting portion of each belt support rail 150 is a urethane high molecular weight (UHMW) resin composition.

As best shown in FIG. 5, the skirtboard 42 for input station 120 may be equipped with a resilient apron 144 of the kind described and claimed in the aforementioned Gordon U.S. Pat. No. 4,989,727. This skirtboard apron, or any other skirtboard apron, is subject to substantially less wear and works considerably more efficiently with the outer belt support rail 150 than with a roller support that has the belt sagging between rollers.

As previously noted, the input station 100 of FIG. 4 has the same construction as station 120 of FIG. 5 except that it is for a wider belt. Thus, at the left-hand side of station 100, FIG. 4, there is a lateral support member 133 between each pair of stanchions 35 and 37. The support members 133 are again preferably lengths of angle iron and have mounting members 135 that enable use of each support member 133 as a direct substitute for one of the rollers 33 of station 20, FIG. 1. In station 100 there are three belt support or slider rails 151 at the left-hand side of the input station, just as there are three belt support rails 150 at the right-hand side of the station. The only difference between station 100, FIG. 4, and the construction of station 120, FIG. 5, is due to the different belt width. Skirtboard 43 may be unchanged from FIG. 1. In FIG. 4, the skirtboard apron 145 is shown with the same configuration as the apron 144 of FIG. 5. However, any desired skirtboard apron and configuration can be employed.

The mounting means for the belt support or slider rails 151 at the left-hand side of input station 100, FIG. 4, are the same as shown in FIG. 5. Again, the mounting means preferably includes a series of bolts 137, one for each belt support rail 151 on each lateral support member 133. Mounting means comprising bolts 137 come in sets, one for each rail 151 for each of the center belt support rollers 31 in the station. As illustrated in FIG. 4, station 100 has four center support rollers 31, four pairs of center stanchions 34 and 35, four sets of lateral support members 132 and four sets of lateral support members 133. Each lateral support member is mounted between a center stanchion and a side stanchion in place of one of the side support rollers of a station like that illustrated in FIG. 1. There are two sets of mounting means exemplified by the bolts 136 and 137, for mounting the belt support rails 150 and 151 on the lateral support members 132 and 133 to support the conveyor belt 21 at an acute angle, at each outside edge, relative to the horizontal center portion of the belt. As previously noted, it is preferred that each of the rails 150 and 151 extends throughout the length of the input station. However, this is not essential; the input station can be constructed in longitudinal sections if desired.

As will be apparent from the foregoing description, it is readily possible to convert a prior art input station like station 20 of FIG. 1 to the input station construction of the invention, station 100 of FIG. 4 or station 120 of FIG. 5. The modification retains the existing frame, such as members 38, the stanchions 34–36, and the skirtboards 42 and 43. The aprons 44 and 45 are preferably replaced by improved aprons 144 and 145, but this is not essential.

What is necessary is the replacement of the side support rollers 32 and 33 of the conventional input station. This is done with two sets of the lateral support members 132 and 133, which may be the same in construction; each lateral support member should be directly mountable on one center-side stanchion combination, 34, 36 or 34, 37, in place of one of the side support rollers 32 or 33. Also needed are two sets of belt support rails 150 and 151 with bolts 136 or other mounting means to mount those rails on the lateral support members 132 and 133. The conversion members can be assembled as a kit to permit quick and convenient changeover.

I claim:

1. A side roller replacement kit for the input station of a belt conveyor of the kind comprising a continuous conveyor belt of given width having a conveyor run extending through an input station to and around a head pulley at a discharge location, and a return run from the head pulley to and around a tail pulley back into the input station, the input station comprising a frame, including a plurality of N pairs of center stanchions each aligned with two side stanchions, located beneath the conveyor run of the belt at an input location, center belt support means comprising a plurality of N center support rollers each having a length less than the belt width, each center support roller mounted between one pair of center stanchions, so that the center support rollers support the central portion of the conveyor belt throughout the input station, and first and second lateral belt support means, on opposite sides of the frame adjacent the center belt support means, each lateral belt support means comprising a plurality of N side support rollers each having a length less than the belt width, each side belt support roller mounted between one center stanchion and one side stanchion;

the side roller replacement kit comprising:

two sets of lateral support members, N lateral support members in each set, each lateral support member mountable between a center stanchion and a side stanchion, in place of one of the side support rollers;

two sets of belt support rails;

and two sets of mounting means, one for each set of belt support rails, for mounting the belt support rails on the lateral support members with the belt support rails extending longitudinally of the belt and with each set of belt support rails supporting one side of the conveyor belt at an acute angle to the central portion of that belt throughout the input station.

2. A side roller replacement kit for a conveyor belt input station, according to claim 1, in which each set of mounting means includes N mounting bolts for mounting the belt support rails on their associated lateral support members.

3. A side roller replacement kit for a conveyor belt input station, according to claim 2, in which each belt support rail extends for the full length of the input station.

4. A side roller replacement kit for the input station for a belt conveyor, according to claim 3, further comprising first and second input skirtboard means, positioned above opposite sides of the conveyor belt and each extending longitudinally of the belt, for sealing off the lateral edges of the conveyor belt at the input station, in which each skirtboard means includes a resilient skirtboard apron mounted on and extending downwardly from a fixed skirtboard, each apron engaging the top surface of the conveyor run of the conveyor belt immediately above the outermost one of the support rails on one side of the conveyor belt.

5. A side roller replacement kit for a conveyor belt input station, according to claim 2, in which each belt support rail is of composite construction, comprising at least one elongated metal base element on which a resin composition slider rail is affixed, the slider rail facing toward and engaging the conveyor belt.

6. A side roller replacement kit for a conveyor belt input station, according to claim 5, in which the slider rail has a UHMW resin composition surface facing the conveyor belt.

* * * * *

Disclaimer 5,350,053—Neil Archer, Paducah, Ky. BELT CONVEYOR INPUT STATION. Patent dated Sep. 27, 1994. Disclaimer filed Sep. 13, 2004, by the assignee Microsoft Corporation.

Hereby enters this disclaimer to claims 1-6 of said patent.

*(Official Gazette March 15, 2005)*